United States Patent
Pylappan et al.

(10) Patent No.: US 11,102,618 B2
(45) Date of Patent: *Aug. 24, 2021

(54) SMART SIGNALING OF LOCATION UPDATES FOR ARRIVAL ESTIMATION AND GENERATION OF ARRIVAL ALERTS

(71) Applicant: Curbside Inc., Palo Alto, CA (US)

(72) Inventors: Seejo Pylappan, Cupertino, CA (US); Denis Laprise, Sunnyvale, CA (US); Jaron Waldman, Palo Alto, CA (US)

(73) Assignee: CURBSIDE INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,388

(22) Filed: Jan. 28, 2020

(65) Prior Publication Data
US 2020/0162850 A1 May 21, 2020

Related U.S. Application Data

(63) Continuation of application No. 16/402,432, filed on May 3, 2019, now Pat. No. 10,560,807.
(Continued)

(51) Int. Cl.
*H04W 64/00* (2009.01)
*H04W 4/029* (2018.01)
(Continued)

(52) U.S. Cl.
CPC .............. *H04W 4/029* (2018.02); *G01S 19/48* (2013.01); *G01S 19/49* (2013.01);
(Continued)

(58) Field of Classification Search
CPC ............ G01C 21/3617; G01C 21/3446; G06Q 10/0833; G06Q 40/08; G06Q 50/265;
(Continued)

(56) References Cited

U.S. PATENT DOCUMENTS 9,177,282 B2  11/2015  Stevens et al.
9,549,289 B2  1/2017  Edge et al.
(Continued)

OTHER PUBLICATIONS

International Search Report and Written Opinion dated Jul. 17, 2019 for corresponding PCT Application No. PCT/US2019/030567.
(Continued)

*Primary Examiner* — Phuoc H Doan
(74) *Attorney, Agent, or Firm* — Polsinelli PC

(57) ABSTRACT

The present disclosure is directed to providing smart signaling of location updates. A method includes receiving a first location update from a tracking device; determining a remaining time for the tracking device to reach a destination location; determining whether the remaining time is within a threshold time of a timing of an arrival alert to be sent to a device associated with the destination location; based on whether the remaining time is within the threshold time or not, configuring the tracking device to send location updates to a server in one of a continuous reporting mode or a significant reporting mode, wherein the tracking device is configured to send the location updates to the server less frequently in the significant reporting mode compared to the continuous reporting mode; and determining when to send the arrival alert based on the location updates received from the tracking device.

20 Claims, 6 Drawing Sheets

Related U.S. Application Data

(60) Provisional application No. 62/666,416, filed on May 3, 2018, provisional application No. 62/666,451, filed on May 3, 2018.

(51) Int. Cl.
| | |
|---|---|
| *H04W 4/02* | (2018.01) |
| *G06Q 10/06* | (2012.01) |
| *G01S 19/49* | (2010.01) |
| *G01S 19/48* | (2010.01) |
| *G08B 21/22* | (2006.01) |
| *H04W 4/021* | (2018.01) |
| *H04L 29/08* | (2006.01) |
| *H04W 4/23* | (2018.01) |
| *H04W 4/38* | (2018.01) |
| *H04W 4/70* | (2018.01) |
| *H04W 4/80* | (2018.01) |
| *H04W 4/12* | (2009.01) |
| *H04W 88/04* | (2009.01) |
| *G06Q 30/06* | (2012.01) |
| *G08G 1/00* | (2006.01) |
| *G06N 20/00* | (2019.01) |
| *G01S 19/13* | (2010.01) |

(52) U.S. Cl.
CPC . *G06Q 10/063114* (2013.01); *G06Q 30/0633* (2013.01); *G08B 21/22* (2013.01); *G08G 1/205* (2013.01); *H04L 67/18* (2013.01); *H04L 67/20* (2013.01); *H04L 67/2823* (2013.01); *H04W 4/021* (2013.01); *H04W 4/023* (2013.01); *H04W 4/025* (2013.01); *H04W 4/12* (2013.01); *H04W 4/23* (2018.02); *H04W 4/38* (2018.02); *H04W 4/70* (2018.02); *H04W 4/80* (2018.02); *H04W 64/003* (2013.01); *H04W 88/04* (2013.01); *G01S 19/13* (2013.01); *G06N 20/00* (2019.01)

(58) Field of Classification Search
CPC ............. H04L 63/1466; H04L 63/1416; H04L 63/1425; H04K 3/22
See application file for complete search history.

(56) References Cited

U.S. PATENT DOCUMENTS

| | | |
|---|---|---|
| 9,928,540 B1 | 3/2018 | Gerard et al. |
| 2012/0069786 A1 | 3/2012 | Wiatrowski et al. |
| 2016/0021007 A1 | 1/2016 | Shuman et al. |
| 2019/0066042 A1* | 2/2019 | Conlon ............. G06Q 10/0833 |
| 2019/0272500 A1 | 9/2019 | Haque |

OTHER PUBLICATIONS

Non-Final rejection dated Dec. 14, 2020 for co-pending U.S. Appl. No. 16/162,902.

* cited by examiner

SMART SIGNALING OF LOCATION UPDATES FOR ARRIVAL ESTIMATION AND GENERATION OF ARRIVAL ALERTS

CROSS REFERENCE TO RELATED APPLICATIONS

This application is a Continuation Application of U.S. application Ser. No. 16/402,432, filed on May 3, 2019, which claims priority to U.S. Provisional Application 62/666,416 filed on May 3, 2018 and U.S. Provisional Application 62/666,451 filed on May 3, 2018, the entire content of both of which are incorporated herein by reference.

TECHNICAL FIELD

The present technology pertains to systems and methods for providing accurate arrival alerts, and more specifically pertains to adjustment in the frequency with which tracking devices send location updates to servers used in providing accurate arrival alerts.

BACKGROUND

Current services that provide arrival alerts often rely on receiving continuous location updates from a moving target (e.g., a vehicle) in order to determine, as accurately as possible, a timing of alerting the destination (e.g., a store) of the moving target's arrival at the destination. For example, when a user is driving to a location of a store to pick up an ordered item, the system's objective is to provide an accurate advance alert (arrival alert) to the operator of the store so that the operator can ensure the user's order is ready for pick when the user arrives.

The requirement for such continuous transmission of location updates from a tracking device (e.g., a mobile device) associated with the moving target to the server, results in large signaling overheads, network resource consumption and consumption of computation capacity at the server. In addition, these continuous transmissions also increase the battery and data usage of the tracking device. For example, given that mobile devices use data and relatively large amount of battery charge to communicate with nearby cell towers or access points, a mobile device that is configured to send location updates to the server via the cell tower or over a WiFi connection, every second or so, can rapidly deplete its battery and increase its data usage.

SUMMARY

Example embodiments are provided for smart signaling of location update for arrival estimation, which provides for adjustment in the frequency with which tracking devices send location updates to servers used in providing accurate arrival alerts of associated users at a location of interest such as a merchant location.

In one aspect, a computer-implemented method for providing arrival alerts, includes receiving a first location update from a tracking device; determining a remaining time for the tracking device to reach a destination location; determining whether the remaining time is within a threshold time of a timing of an arrival alert to be sent to a device associated with the destination location; based on whether the remaining time is within the threshold time or not, configuring the tracking device to send location updates to a server in one of a continuous reporting mode or a significant reporting mode, wherein the tracking device is configured to send the location updates to the server less frequently in the significant reporting mode compared to the continuous reporting mode; and determining when to send the arrival alert to the device associated with the destination location based on one or more of the location updates received from the tracking device.

In one aspect, device includes memory having computer-readable instructions stored therein and one or more processors. The one or more processors are configured to execute the computer readable instructions to receive a first location update from a tracking device; determine a remaining time for the tracking device to reach a destination location; determine whether the remaining time is within a threshold time of a timing of an arrival alert to be sent to a device associated with the destination location; configure the tracking device to report subsequent location updates in a continuous reporting mode if the remaining time within the threshold time or in a significant reporting mode if the remaining time is not within the threshold time; and send the arrival determine to a device associated with the destination location when a most recent location update received from the tracking device in the continuous reporting mode indicates that the remaining time is the same as the timing of the arrival alert.

In one aspect, one or more non-transitory computer-readable medium have computer-readable instructions stored thereon, which when executed by one or more processors, cause the one or more processors to receive a first location update from a tracking device; determine a remaining time for the tracking device to reach a destination location; determine whether the remaining time is within a threshold time of a timing of an arrival alert to be sent to a device associated with the destination location; and based on whether the remaining time is within the threshold time or not, configure the tracking device to send location updates to a server in one of a continuous reporting mode or a significant reporting mode, wherein the tracking device is configured to send the location updates to the server less frequently in the significant reporting mode compared to the continuous reporting mode.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art to reduce the amount of unnecessary signaling and communication between tracking devices and servers, over a cellular or WiFi connection, for tracking devices to provide servers with location updates. At the same time such reduction in unnecessary signaling should be balanced against the need to obtain enough location updates from the tracking devices in order to determine, as accurately as possible, the timing of sending an arrival alert to a destination informing the destination of the arrival of a corresponding user. This balancing requires a "smart" signaling strategy according to which the frequency of signaling used for conveying location updates from a tracking device to a server is dynamically adjusted depending on, among other factors, time and distance of the tracking device from a point in time at which the arrival alert is to be provided to the destination.

The disclosure begins with a description of several example systems in which the concepts described herein can be implemented.

Figure 1:
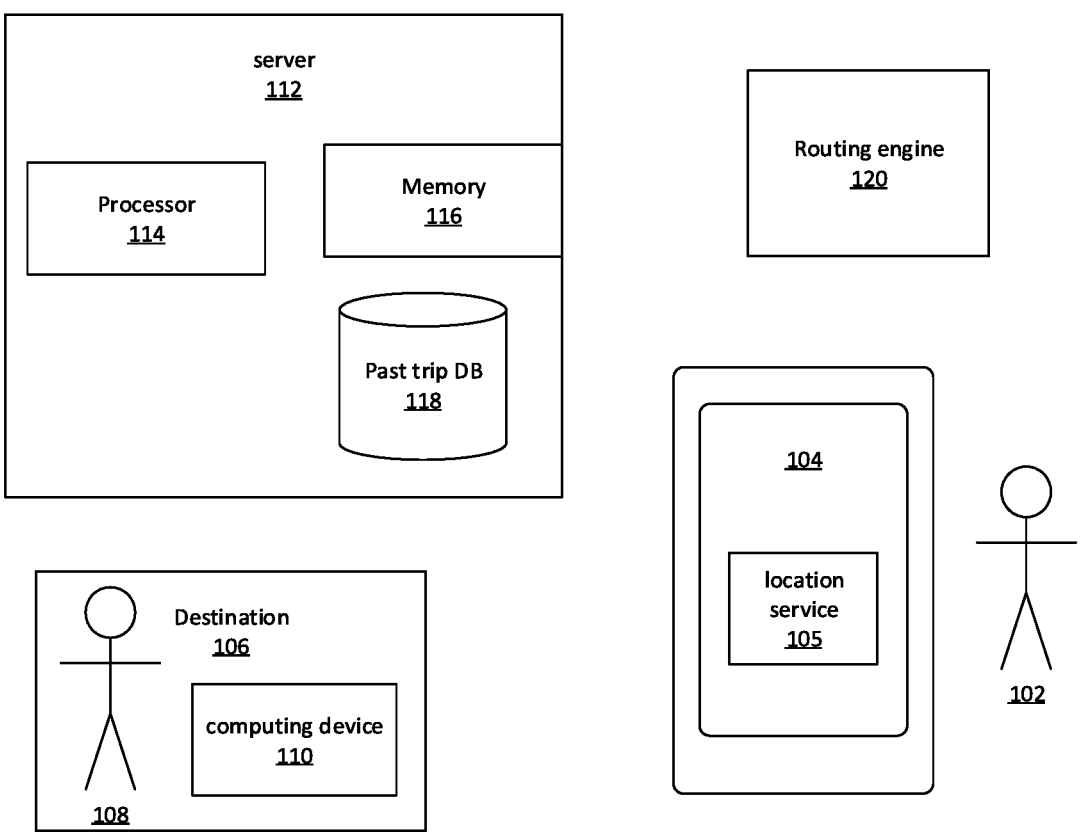
FIG. 1 shows an example system in accordance with one aspect of the present disclosure.

FIG. 1 illustrates an example system in accordance with one aspect of the present disclosure. As illustrated in FIG. 1, system 100 includes a user 102 associated with a tracking device 104 (user device 104 or customer device 104). While not shown in FIG. 1, user 102 and tracking device 104 can be associated with a moving object including, but not limited to, a car, a bus, a bike, a public transportation vehicle, etc. The tracking device 104 can be any known or to be developed electronic device capable of tracking a movement of the user 102 (and the associated moving object) and communication the same with a server 112 over a wired and/or wireless communication platform such as over a cellular network or a WiFi connection. Examples of tracking device 104 include, but are not limited to, a cellular phone, a personal digital assistant (PDA), a laptop, a tablet, a wristband tracking object, etc. In one example, tracking device 104 has location service 105. Location service 105 can be any known or to be developed built-in sensor, device and/or location determining component such as a global positioning system (GPS) device capable of recording geographical coordinates (e.g., latitude and longitude) of tracking device 104 at any given point in time.

While not shown in FIG. 1, tracking device 104, server 112 and any other component of system 100 have other components for enabling communication with other components such as transceivers.

The system 100 further includes a destination 106. Destination 106 can be a target location that is to receive arrival alerts from server 112 informing an operator thereof of the timing of user 102's arrival at destination 106. For example, destination 106 can be a brick-and-mortar store, from which user 102 has ordered item(s) for purchase and is en route to pick up the order. Other examples of destination 106 include, but are not limited to, a restaurant, a department store, other types of service providers such as dry cleaning services, a library, etc. Therefore, it is important for server 112 to provide an arrival alert to destination 106 at a threshold time ahead of the arrival of user 102 (e.g., 8 minutes prior to user's arrival at destination 106) to ensure that the ordered item(s) are ready when user 102 arrives at destination 106. Therefore, the arrival alert needs to be as accurate as possible to avoid or reduce inconveniences (e.g., waiting for the ordered item(s) to be prepared for a period of time after arrival) experienced by user 102 and/or an operator at destination 106.

Destination 106 can have an operator 108 associated therewith such as an employee. Furthermore, destination 106 can have a computing device 110 with which operator 108 interacts to receive arrival alerts, send and receive identifying information to server 112 and/or track device 104, confirm/cancel/adjust orders, etc. Computing device 110 can be any known or to be developed device that is used by destination 106 and is capable of communicating with server 112 over a wired and/or wireless connection such as a WiFi connection. Examples of computing device 110 include, but are not limited to, a tablet, a stationary computer device, a mobile device, any other known or to be developed Point of Sale (POS) devices, etc.

System 100 also includes server 112. Server 112 can have one or more processors such as processor 114 capable of implementing one or more sets of computer-readable instructions stored in one or more memories such as memory 116. Execution of any one or more of these sets of instructions enable server 112 to implement functionalities of methods described below with reference to FIGS. 3-5. These functionalities include, but are not limited to, building destination specific models using machine learning, which can then be used to provide arrival prediction services, determining smart signaling for location receiving location updates, etc.

As shown in FIG. 1, server 112 can also have database 118 (can also be referred to as past trips database 118). Data stored in database 118, as will be described below, will be used by machine learning algorithms implemented by server 112 to build destination specific models and perform arrival prediction services.

System 100 can also include routing engine 120. Routing engine 120 can be any conventional routing engine such as those commonly associated with mapping applications. Such routing engines may take into account distance to a destination and speed limits and in some cases current traffic, weather and time of day conditions in providing preliminary arrival times to server 112, which will be used by server 112 and logics implemented thereon to refine, revise and provide arrival alerts to destination 106. Furthermore, routing engine 120 does not account for other location specific factors such as most likely routes to the destination, likely stops along the way and any other learned factors for generating destination specific models for destinations at server 112.

Server 112 and routine engine 120 can be co-located physically or be configured to communicate over wired and/or wireless networks. Furthermore, each identified component of system 100 can communicate with other components of system 100 and/or any other external component using currently known or to be developed cellular and/or wireless communication technologies and platforms.

Figure 2:
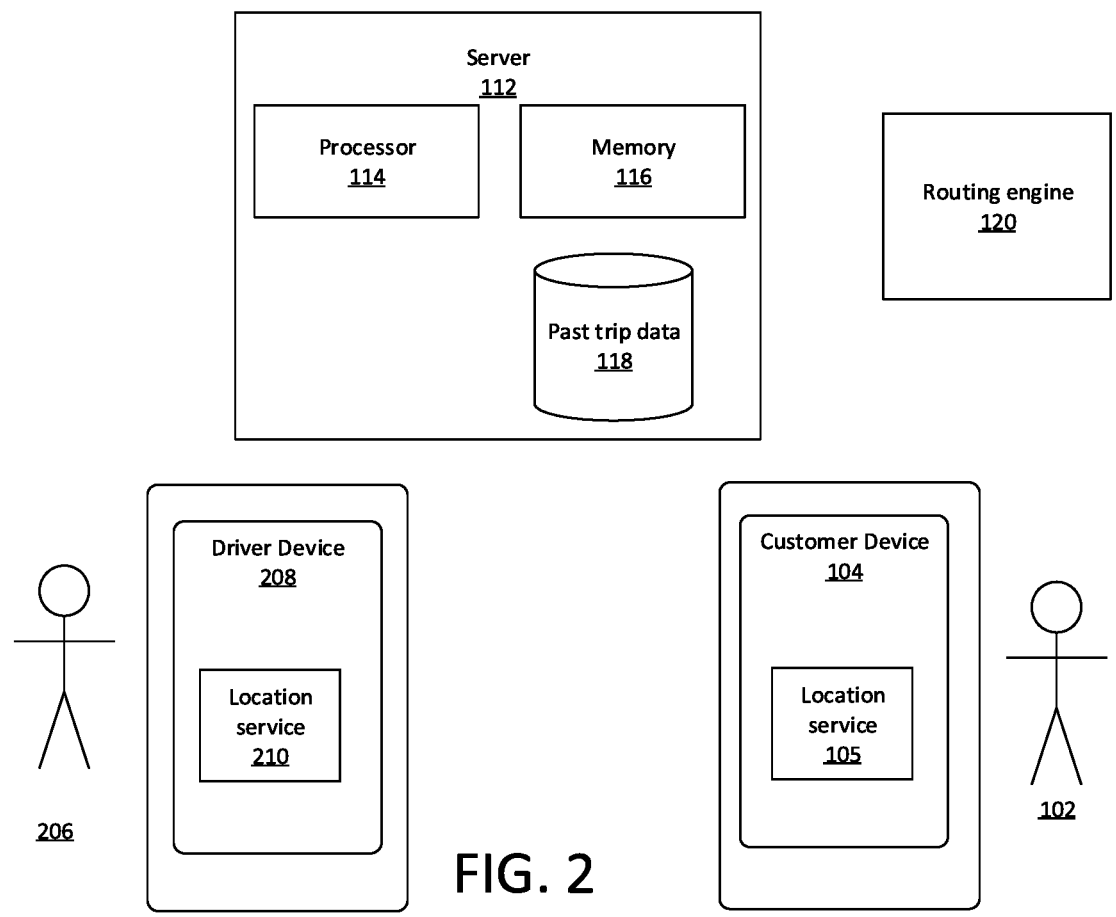
FIG. 2 shows an example system in accordance with one aspect of the present disclosure.

FIG. 2 illustrates an example system in accordance with one aspect of the present disclosure. System 200 of FIG. 2 is the same as system 100 of FIG. 1 except that instead of having user 102 travel to destination 106 to pick up item(s)/service(s) ordered as shown in FIG. 1, a destination such as destination 106 utilizes a delivery service (e.g. that of a driver) to deliver user 102's order(s) to user 102. Therefore, components of system 200 that have the same numerical reference as those in FIG. 1 will not be further described for sake of brevity.

In system 200 shown in FIG. 2, instead of destination 106 and its corresponding components, a driver 206 having an associated tracking device 208 is illustrated. In the context of FIG. 2, driver 206 and associated tracking device 208 is moving toward user 102 (similar to user 102 and tracking device 104 in FIG. 1) while user 102 is stationary (similar to destination 106 in FIG. 1). Accordingly, in the context of FIG. 2, an arrival alert is provided to user 102 informing user 102 of arrival of driver 206. Therefore, various types of calculations for location determination as described in this application, are performed for determining location of tracking device 208 and estimating its arrival at user 102.

Driver 206 and tracking device 208 can be associated with a moving object such as a vehicle operated by driver 206. Tracking device 208 can be any known or to be developed electronic device capable of tracking a movement of the driver 206 (and the associated moving object) and communicate the same with server 112 over a wired and/or wireless communication platform such as over a cellular network or a WiFi connection. Examples of tracking device 208 include, but are not limited to, a cellular phone, a personal digital assistant (PDA), a laptop, a tablet, a wristband tracking object, etc. Location service 210 of tracking device 208 can be the same as location service 105 of tracking device 104 (identified as customer device 104 in FIG. 2) described above with reference to FIG. 1.

While in FIGS. 1 and 2 various components are illustrated and described, inventive concepts are not limited thereto. For example, the number of users, devices, destinations, servers, etc., are not limited to those described and can be more or less. Furthermore, both systems 100 and 200 can have additional components, architecture and/or functionalities associated therewith that are ordinary and/or necessary for proper operations thereof and thus are within the scope of the present disclosure.

As briefly mentioned above, server 112 is tasked with tracking a moving object associated with user 102 in order to provide an alert to destination 106 at a threshold time ahead of user 102's arrival at destination 106, so that operator 108 at destination 106 can prepare and ready order(s) for user 102 to pick up when he or she arrives at destination 106. Such threshold time can be a configurable parameter determined based on various factors such as operator 108 feedback, user 102 feedback, automatic system determination based on prior trips to destination 106, etc. For example, operator 108 can request that server 112 provide operator 108 with an alert when user 102 is 8 minutes away from arriving at destination 106 for picking up his or her order(s). Therefore, server 112 needs to have precise information on user's location in order to provide, as accurately as possible, an arrival alert to operator 108 at destination 106 when user 102 is 8 minutes away from reaching destination 106.

Server 112 implements various techniques to improve the accuracy of the arrival alert provided to destination 106. For example, server 112 applies machine learning to various statistical data to create destination specific model(s) for destination 106. Various statistic data can include, but is not limited to, past completed trips of users to destination 106, past completed trips of user 102, traffic conditions, modes of transportation, types of moving objects associated with user 102 (and/or driver 206 in FIG. 2), weather conditions, times of days, events taking place en route to destination 106 or at destination 106, speed of the moving object, any construction, road closures and improvement, etc. The statistical data can be stored in database 118.

For example, a particular brick-and-mortar store may be located in a downtown area where traffic conditions vary greatly depending on time of day. Server 112 takes this information into consideration to build a destination specific model for the brick-and-mortar store located in the downtown area. During prediction of arrival of user 102 at the downtown location of the brick-and-mortar store and depending on the time of day, server 112 can augment its prediction and improve its arrival prediction using the corresponding destination specific model.

Figure 3:
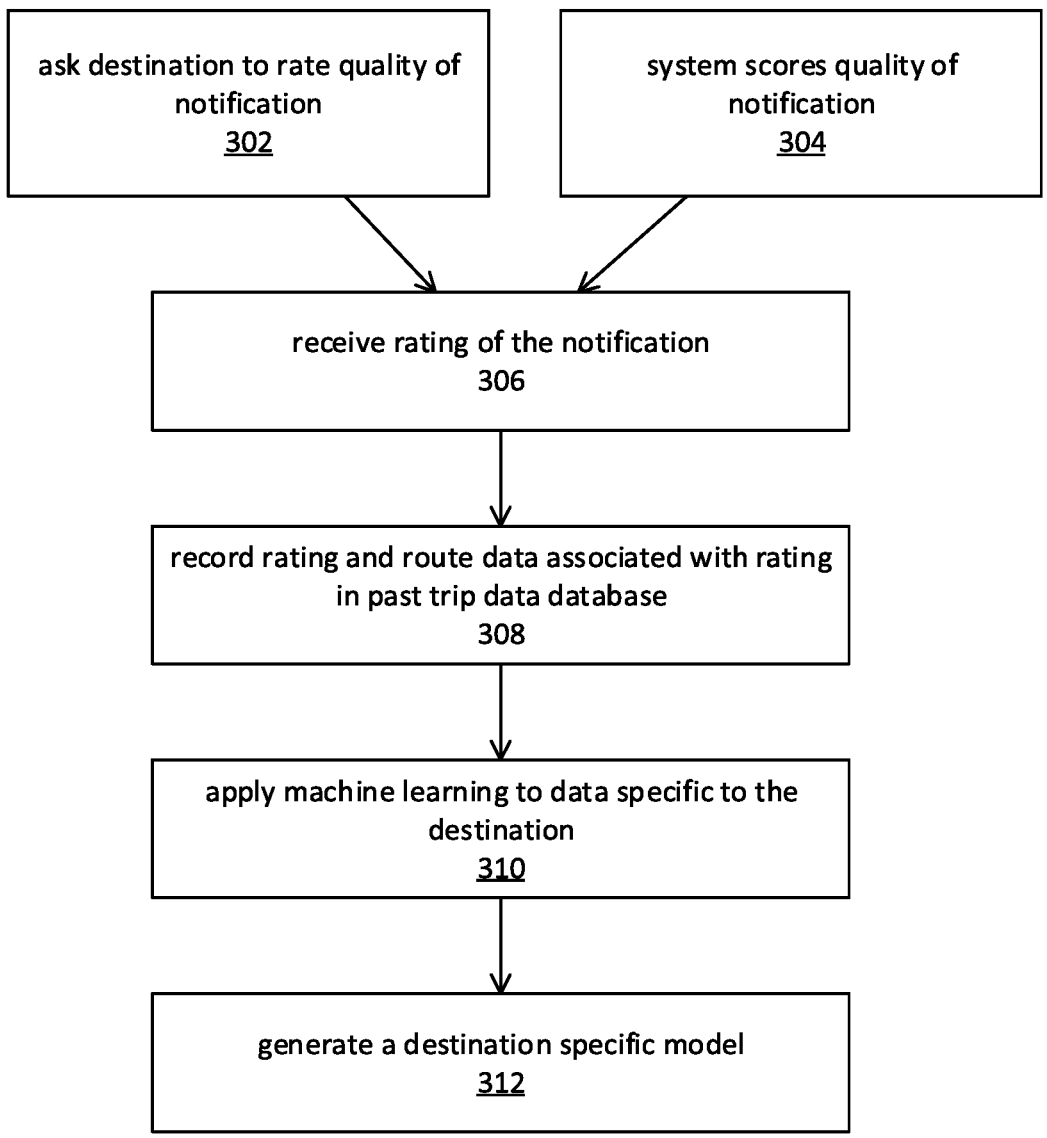
FIG. 3 is an example method for creating a destination specific model in accordance with one aspect of the present disclosure.

FIG. 3 illustrates an example of method for creating destination specific models in accordance with one aspect of the present disclosure. FIG. 3 will be described with reference to FIG. 1. However, the concepts described are equally applicable to the system of FIG. 2 as well. The method illustrated in FIG. 3 begins after one or more notifications have been provided to destination computing device 110 regarding an arrival prediction of user 102 at destination 106 to pick up order(s) (or one or more trips to destination 106 have been completed). Server 112 can store a collection of data in database 118. The data can be any one or more of statistical data examples provided above. In addition, server 112 can store information regarding the quality of past notifications and an identifier of the past notifications. For example, every time server 112 has provided an arrival alert to destination 106 indicating that user 102 will arrive in 8 minutes, server 112 compares this estimated arrival time to an actual time it took user 102 to arrive at destination 106. For example, while server 112 predicted, at time T0, that user 102 will arrive at destination 106 in 8 minutes, in reality, it may take user 102 6 minutes from T0 to arrive at destination 106. This indicates a prediction error of 25%. Server 112 stores this prediction error in database 118. During the next round of prediction and in providing the arrival alert, server 112 adjusts its prediction by 25% before providing the arrival alert (e.g., in the particular example described above, instead of providing the arrival alert at T0, server 112 now provides the arrival alert at T1 which is 2 minutes earlier than T0).

At S302, server 112 queries computing device 110 of destination 106 for rating a quality of a recently provided arrival alert. Operator 108 operating destination computing device 110 can respond to the query. Upon receiving the response, server 112 stores the rating at S306. In addition to, simultaneously with or instead of querying computing device 110 for rating, at S304, server 112 can calculate a rating or prediction error regarding the arrival alert, as described above. Similarly, the calculated rating is received at S306.

At S308, server 112 can record the received rating(s), per S302 and S304, in database 118 in association with an identification (ID) of the notification. The ID can be an identification of a particular transaction between user 102 and a merchant at destination 106, can be an identification associated with user 102, can be an identification associated with destination 106 or any combination thereof.

Server 112 can also store in database 118, information regarding a route taken by user 102 in connection with a recently completed trip to destination 106, and any other data pertinent to the trip that resulted in the notification. The route taken by user 102 can be learned from data reported by location service 105 to server 112 while user 102 and associated computing device 104 were traveling to destination 106. In some examples, from this route information, server 112 can determine if user 102 made any stops while in route to destination 106. Server 112 can also record a time of day, day of week, and date associated with the notification in database 118. Server 112 can aggregate the above data for trips by many users.

At S310, server 112 applies machine learning algorithm(s) to the historical data specific to destination 106 stored in database 118. At S312, server 112 generates destination specific model for destination 106 based on the machine learning algorithm(s) applied to stored data at S310. In one example, destination specific model may be created or trained by analyzing factors associated with notifications that were considered of good quality and factors associated with notifications that were considered of poor quality. Since the destination specific model is generated through machine learning, some dimensions of destination specific model may not have any semantic meaning while some dimensions may have a semantic significance. For example, those dimensions having a semantic meaning can include likelihood that a user will make other stops along the route, likelihood that a user will encounter traffic along the route, the most likely routes to the destination, etc.

In some examples, machine learning may initially be trained on all data in database 118 regardless of destination to result in a location non-specific model. In such examples, destination specific model may be the result of tuning the location non-specific model for factors relevant to the specific destination 106.

As can be seen from the above description, server 112 relies on location updates received from tracking device 104 in order to determine current location of user 102, which is then used for determining/estimate the timing of sending the arrival alert to computing device 110 of destination 106. Depending on the distance and time of user 102 from destination 106, it may or may not be critical for server 112 to receive continuous location updates from tracking device 104. For example, when the most recent location update received from tracking device 104 indicates that user 102 is one hour and 20 miles away from destination 106, it is not critical for server 112 to receive updated location information from tracking device 104 in the next 30 seconds indicating that the user 102 is 59 minutes and 19 miles away from destination 106. Therefore, the frequency of location updates provided by tracking device 104 can be reduced (e.g., next update can be provide when user is 10 miles or 30 minutes away from destination 106).

However, as the user's location along the route approaches closer to the threshold time for providing the arrival alert (e.g., the 8 minute mark in the example described above), it is important that tracking device 104 provides server 112 with more frequent updates (e.g., every 30 seconds) about its location.

Furthermore, tracking devices such as mobile devices have various built-in functionalities that allow them to switch modes for reporting location updates (for example, to nearby cell towers). Example modes include a continuous reporting mode, where a device reports its location to nearby cell towers and the server frequently (e.g., every 30 seconds, 10 seconds, 1 second, etc.) and significant mode, where a device is to sends location updates to nearby cell towers and the server relatively infrequently (e.g., after a target reporting time is lapsed or a target distance traveled, where the target reporting time and the target distance can vary from one reporting instance to the next).

Hereinafter, examples will be described according to which server 112 determines, based on various conditions, whether the device is to send location updates using continuous or significant mode as well as thresholds of reporting (e.g., target reporting time and target distance mentioned above) in the significant mode.

Figure 4:
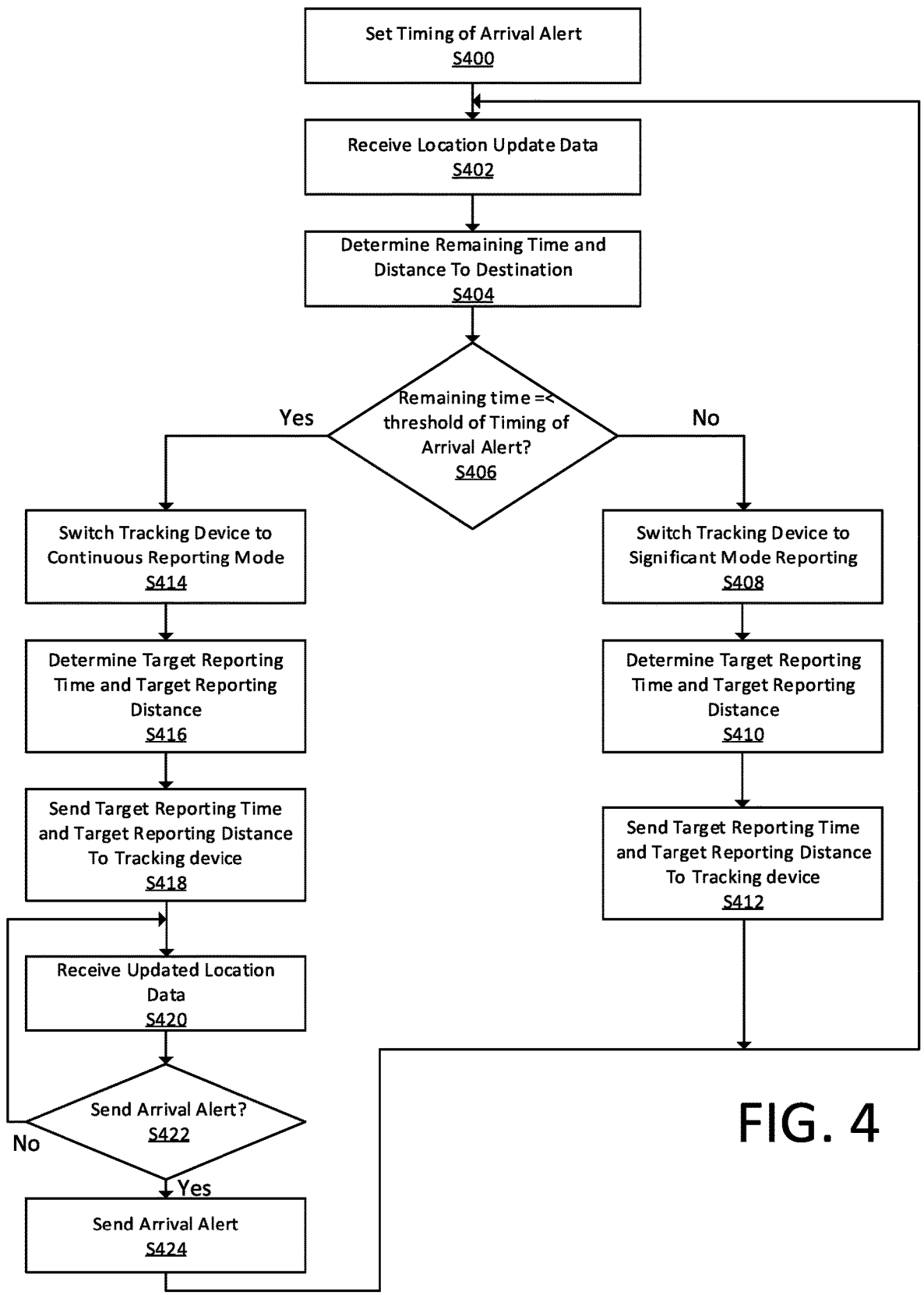
FIG. 4 is an example method of smart signaling of location updates in accordance with one aspect of the present disclosure.

FIG. 4 is an example method of smart signaling of location updates in accordance with one aspect of the present disclosure. FIG. 4 will be described with reference to system 100 of FIG. 1. However, FIG. 4 is equally applicable to system 200 of FIG. 2. Furthermore, FIG. 4 will be described from the perspective of server 112. However, it is understood by those skill in the art that one or more processors such as processor 114 of server 112 executes computer readable instructions stored on or more memories such as memory 116 to implement the functionalities described below.

At S400, server 112 sets a threshold time for providing destination 106 with an arrival alert. As indicated above, the threshold time can be set based on a requested time by operator 108 of destination 106. However, the threshold time can also be set based on a requested time by a particular user such as user 102, based on an average of requested times for various users or can be set automatically by server 112 based on past arrival times and accuracies thereof for destination 106 and/or across multiple destinations. For example, based on one or more requested times from destination 106, user 102 and or automatic determination by server 112 itself, server 112 sets the threshold time for sending an arrival alert to destination 106 to 8 minutes. Hereinafter, the threshold time is also referred to timing of arrival alert.

In one example, prior to or simultaneous with the setting the timing of arrival alert, server 112 receives an indication that user 102 has placed an order for item(s), service(s), etc., with destination 106 (e.g., a merchant, a restaurant, a service provider, etc.) for pick up.

At S402, server 112 receives a location update (first location update) via, for example, a global positioning system (GPS) signal from tracking device 104 associated with user 102. In one example, server 112 receives the location update via one or more cell towers (e.g., eNode-Bs, base stations) and/or WiFi access points that is/are communicating with tracking device 104. The location update may also be referred to as location update data or updated location data.

At S404 and based on the last location update received from tracking device 104, an amount of time and a distance of user 102 to destination 106, which may be referred to as remaining time and remaining distance of user 102 from destination 106, respectively. In one example, the remaining time and distance are determined based on the updated location data received at S402, destination specific model for destination 106 as well as other factors associated with the route taken by user 102 to reach destination 106 including but not limited to time of day, traffic conditions, weather conditions, events along the route, etc. as provided by, for example, routing engine 120.

At S406, server 112 determines if the remaining time derived at S404 is within a predetermined threshold of the arrival alert timing set at S400. The predetermined threshold can be a configurable parameter determined based on various factors and empirical studies, such as but not limited to, ratings and accuracies of previously provided arrival alerts, etc. For example, the predetermined threshold can be 2 minutes. In other words, at S406, server 112 determines if the remaining time is less than or equal to 2 minutes from the 8 minute mark in the example described above (e.g., if the remaining time to destination 106 is equal to or less than 10 minutes).

If at S406, server 112 determines that the remaining time is not within the predetermined threshold of the arrival alert timing (e.g., tracking device 104 is relatively far from destination 106), then at S408, server 112 sends a command to tracking device 104 to switch tracking device 104 to send location updates in the significant mode described above.

Next, at S410, server 112 determines a target reporting time and/or a target reporting distance at which tracking device 104 is to report its next location to server 112 while operating in the significant mode. For example, at S404, server 112 may have determined that tracking device 104 is 20 minutes and 20 miles away from destination 106, which is not within the predetermined threshold of the arrival alert timing of 8 minutes. Therefore, server 112 determines that in the significant reporting mode, tracking device 104 should report its next location after 5 minutes has elapsed or a distance of 8 miles has been traveled by user 102. The determination of specific target time and/or target distance by server 112 can be based on many factors including, but not limited to, destination specific model for destination 106, traffic conditions, etc.

Upon determining the next target time/distance for reporting, at S412, server 112 sends the target time and target distance for reporting back to tracking device 104.

Thereafter, the process reverts back to S402 and server 112 repeats S402-S424, as appropriate.

Referring back to S406, if at S406, server 112 determines that the remaining time of tracking device 104 to destination 106 (based on the latest reported position of tracking device 104 at S402) is within the predetermined threshold of the arrival alert timing (e.g., less than 2 minutes in the example described above), then at S414, server 112 sends a command to tracking device 104 to put the device in continuous reporting mode described above. As mentioned in the continuous reporting mode, tracking device 104 sends location updates to server 112 more frequently compared to when tracking device 104 is reporting in the significant mode and at set intervals (e.g., every 10 seconds, 5 seconds, 1 second, etc.). This in turn increases the battery and data usage of tracking device 104 compared to the significant reporting mode where locations updates are transmitted less frequently as per S406-S414 described above.

Next, at S416, server 112 determines a target reporting time and/or a target reporting distance at which tracking device 104 is to report its next location to server 112 while operating in the continuous mode. For example, server 112 may have determined that tracking device 104 is 9 minutes and 2 miles away from destination 106, which is within the predetermined threshold of the arrival alert timing of 8 minutes. Therefore, server 112 determines that in the continuous reporting mode, tracking device 104 should report its next location after 30 seconds has elapsed or a distance of 0.1 mile has been traveled by user 102. The determination of specific target time and/or target distance by server 112 can be based on many factors including, but not limited to, destination specific model for destination 106, traffic conditions, etc.

Upon determining the next target time/distance for reporting, at S418, server 112 sends the target time and target distance of S416 back to tracking device 104. At S420, server 112 receives updated location data of tracking device 104 according to the continuous reporting mode. Thereafter, at S422, server 112 determines if arrival alert should be sent to destination 106 or not. In one example, server 112 makes the determination of S422 by determining if the remaining time of tracking device 104 is equal to the arrival alert timing (e.g., if the remaining time of the tracking device 104 to destination 106 is equal to 8 minutes). This determination can be based on the updated location information received at S418 as well as destination specific model for destination 106, ratings of past arrival alerts, average accuracy error of past arrival alerts, etc.

If at S422, server 112 determines that the arrival alert should not be sent, the process reverts back to S420 and server 112 repeats S420 and S422 until server 112 determines at S422 that the arrival alert should be sent.

However, if at S422, server 112 determines that the arrival alert should be sent to destination 106, then at S424, sends the arrival alert to destination 106. Thereafter, the process reverts back to S402 and server 112 repeats S402 to S424, as appropriate.

As can be appreciated, the method of FIG. 4 results in a smart selection of a reporting mode for tracking device 104 to report back to server 112 with location updates. This results in a dynamic change in frequency and number of reporting and signaling between tracking device 104 and server 112. This in turn reduces the number of unnecessary location reporting by tracking device 104, which in turn reduces battery and data usage of tracking device 104 as well as the amount of signaling and network resource consumption. Furthermore, dynamic change in frequency of location reporting by tracking device 104 also provides the advantage that server 112 has to perform less calculations related to remaining time and distance of tracking device 104 to destination 106.

Figure 5:
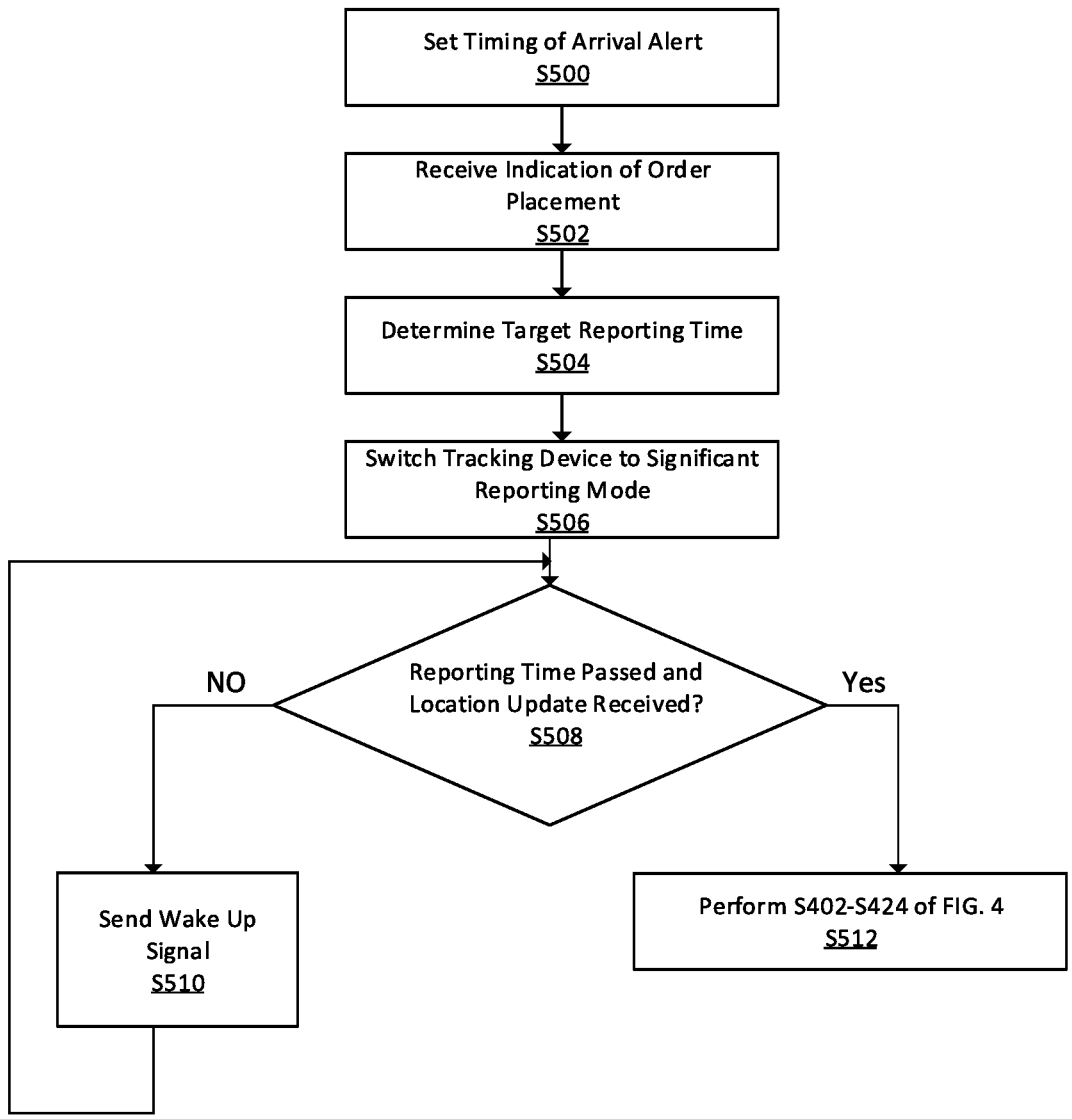
FIG. 5 is an example method of smart signaling of location updates in accordance with one aspect of the present disclosure.

FIG. 5 is an example method of smart signaling of location updates in accordance with one aspect of the present disclosure. Many steps of FIG. 5 are the same as their corresponding steps in FIG. 4. These same steps will be identified below and their descriptions will be omitted for sake of brevity.

FIG. 5 will be described with reference to system 100 of FIG. 1. However, FIG. 5 is equally applicable to system 200 of FIG. 2. Furthermore, FIG. 5 will be described from the perspective of server 112. However, it is understood by those skill in the art that one or more processors such as processor 114 of server 112 executes computer readable instructions stored on or more memories such as memory 116 to implement the functions described below.

S500 is the same as S400 at which server 112 sets a timing for providing the arrival alert to destination 106. At S502, server 112 receives an indication that user 102 has placed an order with destination 106. In one example, S500 and S502 take place simultaneously. As part of this indication at S502, server 112 receives a timestamp for when the order is placed and a scheduled/desired pick up time at destination 106. For example, user 102 places, using an application executed on tracking device 104 or a separate mobile device associated with user 102, an order with destination 106 at 7 AM with a scheduled pick up time of 6 PM.

At S504 and based on the order placement time and scheduled pick up time at S502, server 112 determines a target reporting time for tracking device 104 to send a location update to server 112. For example, given that the order was placed at 7 AM and the pickup time is not until 6 PM, server 112 determines that next location update should be transmitted by tracking device 104 at 5 PM.

Therefore, at S506, server 112 sends a command to tracking device 104 to put it in a significant reporting mode, as described above, with the target reporting time specified per S502.

At S508, and at the target reporting time, server 112 determines if the target reporting time has passed and a location update is received from tracking device 104. If the reporting time has passed without tracking device 104 providing location updates as instructed, at S510, server 112 sends a wake up signal to tracking device 104 including but not limited to, a text message, a push notification, etc. The process then reverts back to S508.

Upon determining that the target reporting time has passed and location update data received at S508, at S512, the process reverts back to S402, where server 112 performs S402 to S424 in the same manner as described above with reference to FIG. 4.

According to FIG. 5, in addition to the reduction in battery and data usage as well as computational and network resource consumptions achieved by the method of FIG. 4, further reductions can also be achieved by taking into consideration the time at which order(s) for item(s) are placed and their scheduled pick up.

Figure 6:
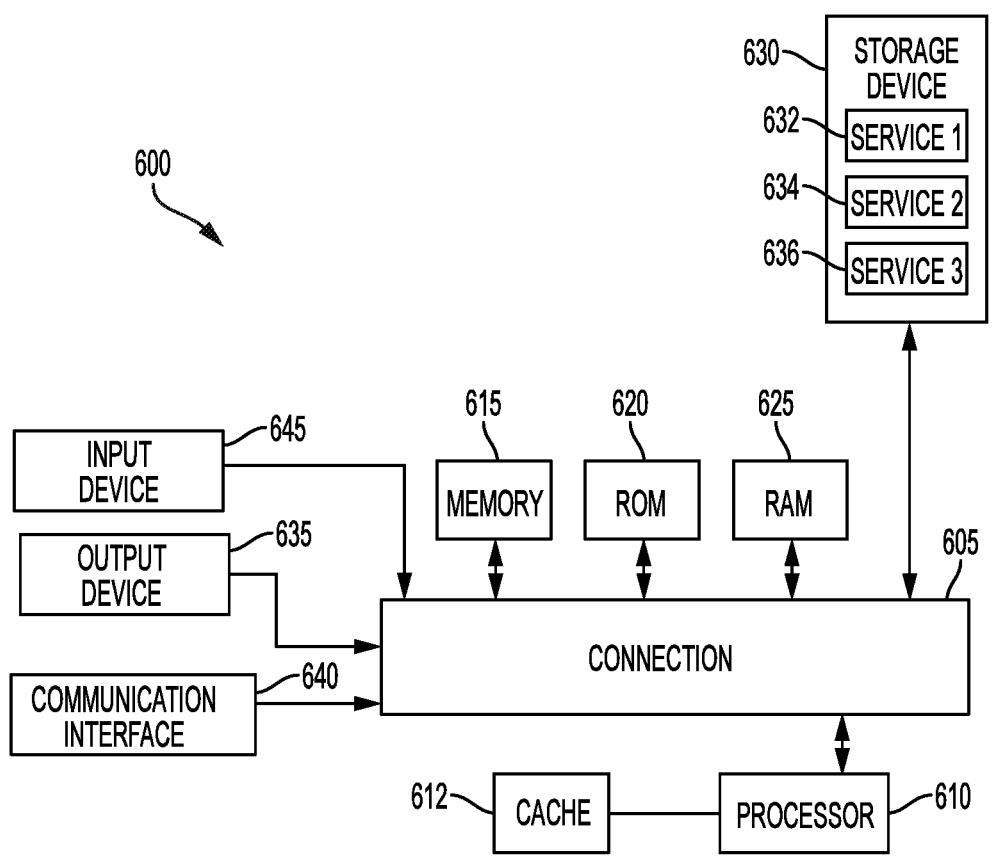
FIG. 6 shows an example of a system for implementing the present technology in accordance one aspect of the present disclosure.

FIG. 6 shows an example of a system for implementing the present technology in accordance one aspect of the present disclosure. FIG. 6 shows an example of computing system 600 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) and random access memory (RAM) to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for providing arrival alerts, the method comprising:
   determining whether an estimated arrival time of a tracking device to a destination location is within a threshold of a time at which an arrival alert is to be sent to a device associated with the destination location;
   based on whether the estimated arrival time is within the threshold or not, configuring the tracking device to send location updates to a server in one of a continuous reporting mode or a significant reporting mode, wherein the tracking device is configured to send the location updates to the server less frequently in the significant reporting mode compared to the continuous reporting mode; and
   sending the arrival alert to the device associated with the destination location based on one or more of the location updates received from the tracking device.

2. The computer-implemented method of claim 1, further comprising:
   configuring the tracking device to send the location updates in the continuous reporting mode when the estimated arrival time is within the threshold.

3. The computer-implemented method of claim 1, further comprising:
   configuring the tracking device to send the location updates in the significant reporting mode when the estimated arrival time is not within the threshold.

4. The computer-implemented method of claim 1, further comprising:
   sending, after every location update received from the tracking device, a next target reporting time or a target reporting distance for a next location update to be sent by the tracking device to the server.

5. The computer-implemented method of claim 4, wherein determining the next target reporting time or the next target reporting distance comprises:
   determining a destination specific model for the destination location, the destination specific model being based on data corresponding to past trips by the tracking device or other tracking devices to the destination location and environmental conditions; and
   applying the destination specific model to the estimated arrival time or a remaining distance derived from a location update received from the tracking device to determine the next target reporting time and the next target reporting distance.

6. The computer-implemented method of claim 1, wherein determining when to send the arrival alert to the device associated with the destination location includes sending the arrival alert if a most recent location update received from the tracking device in the continuous reporting mode indicates that the estimated arrival time for the tracking device to arrive at the destination location is the same as the timing of the arrival alert.

7. The computer-implemented method of claim 1, further comprising:
   determining, by the server, a first time at which a user associated with the tracking device placed an order for pick at the destination location and a second time indicative of a scheduled pick time of the order; and
   prior to receiving a location update and based on a difference between the first time and the second time, configuring the tracking device to send the location updates in the significant reporting mode; and
   determining an initial reporting time for the tracking device to send the first location update.

8. A device comprising:
   memory having computer-readable instructions stored therein; and
   one or more processors configured to execute the computer readable instructions to:
      determine whether an estimated arrival time of a tracking device to a destination location is within a threshold of a time at which an arrival alert is to be sent to a device associated with the destination location;
      configure the tracking device to report subsequent location updates in a continuous reporting mode if the estimated arrival time within the threshold or in a significant reporting mode if the estimated arrival time is not within the threshold; and
      send the arrival determine to the device associated with the destination location when a most recent location update received from the tracking device in the continuous reporting mode indicates that the estimated arrival time is the same as the timing of the arrival alert.

9. The device of claim 8, wherein the device is a server that is communicatively coupled to the device associated with the destination location and the tracking device.

10. The device of claim 8, wherein the arrival alert is configured to provide an advance notice to a first user associated with the device at the destination location of a time of arrival of a second user at the destination location, the second user being associated with the tracking device.

11. The device of claim 8, wherein the one or more processors are further configured to execute the computer-readable instructions to send, after every location update received from the tracking device, a next target reporting time or a next target reporting distance for a next location update to be sent by the tracking device to the device.

12. The device of claim 11, wherein the one or more processors are further configured to execute the computer-readable instructions to determine the next target reporting time or the next target reporting distance by:
   determining a destination specific model for the destination location, the destination specific model being based on data corresponding to past trips by the tracking device or other tracking devices to the destination location and environmental conditions; and applying the destination specific model to the estimated arrival time or a remaining distance derived from a location update received from the tracking device to determine the next target reporting time and the next target reporting distance.

13. A system comprising:

the device, the tracking device and the device associated with the destination location of claim 8, wherein the tracking device is a mobile device associated with a customer traveling to the destination location to pick up an item, the destination location is a location of a merchant from which the item is to be picked up by the customer, the device associated with the destination location is a point of sale device of the merchant, and the device is a server that provides the arrival alert to which the customer and the merchant subscribe.

14. One or more non-transitory computer-readable medium having computer-readable instructions stored thereon, which when executed by one or more processors, cause the one or more processors to determine whether estimated arrival time of a tracking device to a destination location is within a threshold of a time at which an arrival alert is to be sent to a device associated with the destination location; and based on whether the estimated arrival time is within the threshold time or not, configure the tracking device to send location updates to a server in one of a continuous reporting mode or a significant reporting mode, wherein the tracking device is configured to send the location updates to the server less frequently in the significant reporting mode compared to the continuous reporting mode.

15. The one or more non-transitory computer-readable medium of claim 14, wherein execution of the computer-readable instructions by the one or more processors, cause the one or more processors to configure the tracking device to send the location updates in the continuous reporting mode when the estimated arrival time is within the threshold.

16. The one or more non-transitory computer-readable medium of claim 14, wherein execution of the computer-readable instructions by the one or more processors, cause the one or more processors to configure the tracking device to send the location updates in the significant reporting mode when the estimated arrival time is not within the threshold.

17. The one or more non-transitory computer-readable medium of claim 14, wherein execution of the computer-readable instructions by the one or more processors, cause the one or more processors to send, after every location update received from the tracking device, a next target reporting time or a target reporting distance for a next location update to be sent by the tracking device to the server.

18. The one or more non-transitory computer-readable medium of claim 17, wherein execution of the computer-readable instructions by the one or more processors, cause the one or more processors to determine the next target reporting time or the next target reporting distance by:

determining a destination specific model for the destination location, the destination specific model being based on data corresponding to past trips by the tracking device or other tracking devices to the destination location and environmental conditions; and applying the destination specific model to the estimated arrival time or a remaining distance derived from a location update to determine the next target reporting time and the next target reporting distance.

19. The one or more non-transitory computer-readable medium of claim 14, wherein execution of the computer-readable instructions by the one or more processors, cause the one or more processors to by sending the arrival alert if a most recent location update received from the tracking device in the continuous reporting mode indicates that the estimated arrival time for the tracking device to arrive at the destination location is the same as the timing of the arrival alert.

20. The one or more non-transitory computer-readable medium of claim 14, wherein execution of the computer-readable instructions by the one or more processors, cause the one or more processors to"

determine, by the server, a first time at which a user associated with the tracking device placed an order for pick at the destination location and a second time indicative of a scheduled pick time of the order; and prior to receiving a location update and based on a difference between the first time and the second time, configure the tracking device to send the location updates in the significant reporting mode; and determine an initial reporting time for the tracking device to send the location update.

* * * * *